Dec. 29, 1970  R. W. BRUNDAGE  3,551,079
PRESSURE SEALED HYDRAULIC PUMP OR MOTOR
Filed May 5, 1969  3 Sheets-Sheet 1
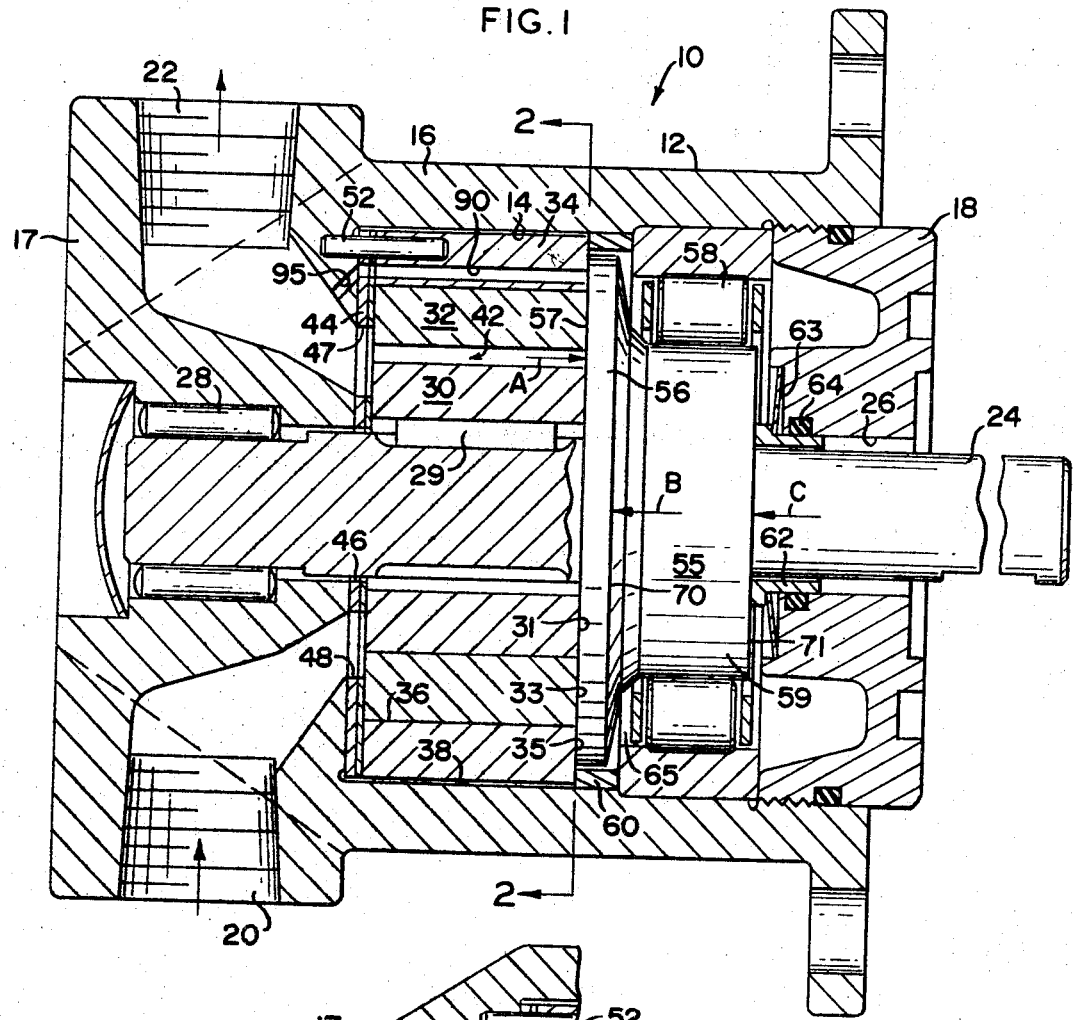
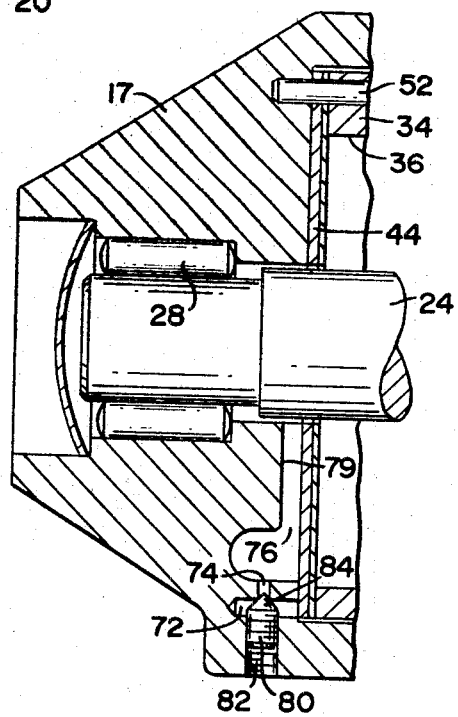
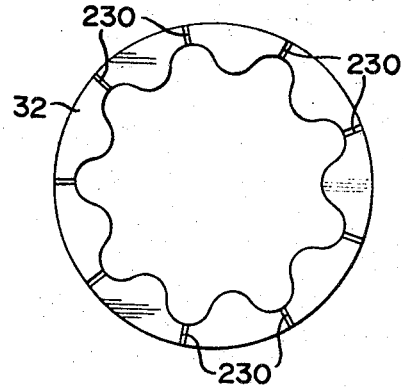
INVENTOR.
ROBERT W. BRUNDAGE
BY
Meyer, Tilberry & Body
ATTORNEYS.

INVENTOR.
ROBERT W. BRUNDAGE
BY
Meyer, Tilberry & Body
ATTORNEYS.

Dec. 29, 1970         R. W. BRUNDAGE         3,551,079
PRESSURE SEALED HYDRAULIC PUMP OR MOTOR
Filed May 5, 1969                          3 Sheets-Sheet 3

INVENTOR.
ROBERT W. BRUNDAGE
BY
*Meyer, Tilberry & Body*
ATTORNEYS.

United States Patent Office 3,551,079
Patented Dec. 29, 1970

3,551,079
PRESSURE SEALED HYDRAULIC
PUMP OR MOTOR
Robert Wesley Brundage, St. Louis, Mo., assignor to
Emerson Electric Co., St. Louis, Mo.
Filed May 5, 1969, Ser. No. 821,659
Int. Cl. F04c 15/00, 5/00, 1/06
U.S. Cl. 418—39                    23 Claims

ABSTRACT OF THE DISCLOSURE

A pressure sealed hydraulic device of the internal gear type in which a sealing member is integral with the shaft and is movable axially to establish a running clearance with the gears and/or eccentric bearing. The high pressure hydraulic fluid of the device flows between the sealing member and the gears and/or bearing to a pressure seal chamber wherein the pressure builds up to move the member axially toward the gears and bearing. The amount of clearance between the gears and bearing is controlled by a metered flow of fluid from the seal chamber thereby maintaining a predetermined pressure level in the seal chamber.

---

This invention relates to the art of hydraulic devices and, more particularly, to an improved hydraulic pump or motor.

The present invention is particularly applicable to a hydraulic pump of the internal gear type and will be described with particular reference thereto, although it will be appreciated that the invention is equally applicable to other types of hydraulic pumps or motors. For the purpose of simplicity of disclosure, the invention will be described primarily in relation to a pump and reference will be made to inlet and outlet ports, inlet and outlet manifolds and increasing and decreasing volume chambers, all of which will be at low and high pressures respectively. It will be appreciated that as applied to a hydraulic motor, the relationship of the low and high pressures will be reversed. Moreover, as will be pointed out hereinafter, reversal of direction of rotation of the hydraulic device will merely reverse the inlet and outlet ports and manifolds and the low and high pressure chambers.

BACKGROUND OF THE INVENTION

Hydraulic devices of the type to which this invention is applicable are normally comprised of a housing and a shaft extending into and rotatably supported in the housing in suitable bearings. A plurality of members such as inter-meshed internally toothed and externally toothed gears rotate with the shaft in a bearing surface eccentric to the axis of the shaft to define a plurality of increasing and decreasing volume pumping chambers. Inlet and outlet manifolds are formed in the housing and communicate with these chambers. Normally, when functioning as a pump, the chambers which are decreasing in volume communicate with a discharge port and are at high hydraulic pressures while the chambers which are increasing in volume communicate with an inlet port and are at relatively low hydraulic pressures.

The high hydraulic pressures generated by such devices exert unsymmetrical radial and axial forces on the gears and bearings, thus creating problems both in sealing and bearing load distribution. These problems are particularly aggravated in hydraulic devices having pressures greater than 1,000 lbs. per square inch. At such pressures, constructions and expedients usable at lower hydraulic pressures are often unsatisfactory and inapplicable as solutions to the problems encountered.

Disclosed in my prior Pats. Nos. 3,034,448, 3,127,843, 3,198,127 and 3,240,158 are various improved arrangements for high pressure pumps and motors in which a sealing member is integrally connected to the shaft with both the shaft and sealing member being axially movable under hydraulic pressure to pressure seal the axial ends of the increasing and decreasing volume chambers. As described more specifically in those patents, the high pressure fluid of the device is used to urge one axial face of the sealing member into pressure sealed engagement with the rotating gears.

The present invention carries forward the principle disclosed in those patents of an axially shiftable, integral sealing member and shaft but provides an improved means for controlling the hydraulic pressure which acts on the sealing member whereby a controlled face clearance between the sealing member and the rotating gears may be obtained.

SUMMARY OF THE INVENTION

The invention particularly resides in the means by which the hydraulic pressure is conveyed to the exposed face of the sealing member, and the means by which the high pressure fluid is returned to the source of low pressure. More specifically, the basic concept of this invention is to employ a metered flow of high pressure fluid from the decreasing volume chambers to the exposed face of the sealing member together with a metered discharge of this high pressure back to the source of low pressure. This basic concept is characterized in its preferred embodiment by the use of a controlled face clearance between the rotating gears and/or bearing member and the sealing face of the sealing member whereby hydraulic fluid in the high pressure chamber is permitted to flow into the pressure seal chamber in the housing cavity where it acts against the exposed face of the sealing member to urge the sealing member into sealing relation with the rotating gears with the pressure of the fluid in the pressure seal chamber being controlled by a metering orifice which controls the flow of the high pressure fluid from the seal chamber back to the source of low pressure. In this manner, the face clearance between the sealing member and the gears may be accurately controlled and excessive pressures in the pressure seal chamber are eliminated thus reducing the necessity for complex and expensive housing and shaft seals. It is contemplated that additional high pressure fluid may be used to supplement the flow of fluid, through the face clearance, such additional fluid being transmitted through strategically located bleed paths to the pressure seal chamber.

It is an object of this invention to provide a hydraulic device having improved pressure sealing characteristics.

It is a further object of this invention to provide a hydraulic device having improved volumetric characteristics.

Still another object of this invention is to provide a hydraulic device which is capable of generating high levels of torque at the start of its operating cycle.

Referring now to the drawings wherein like reference numerals indicate like parts in the various views:

FIG. 1 is a cross-sectional view perpendicular to the neutral axis of a hydraulic device illustrating a preferred embodiment of the present invention.

FIG. 5 is a sectional view along line 5—5 of FIG. 4.

FIG. 7 illustrates a modified form of the outer ring gear.

DETAILED DESCRIPTION OF THE INVENTION

Figure 6:
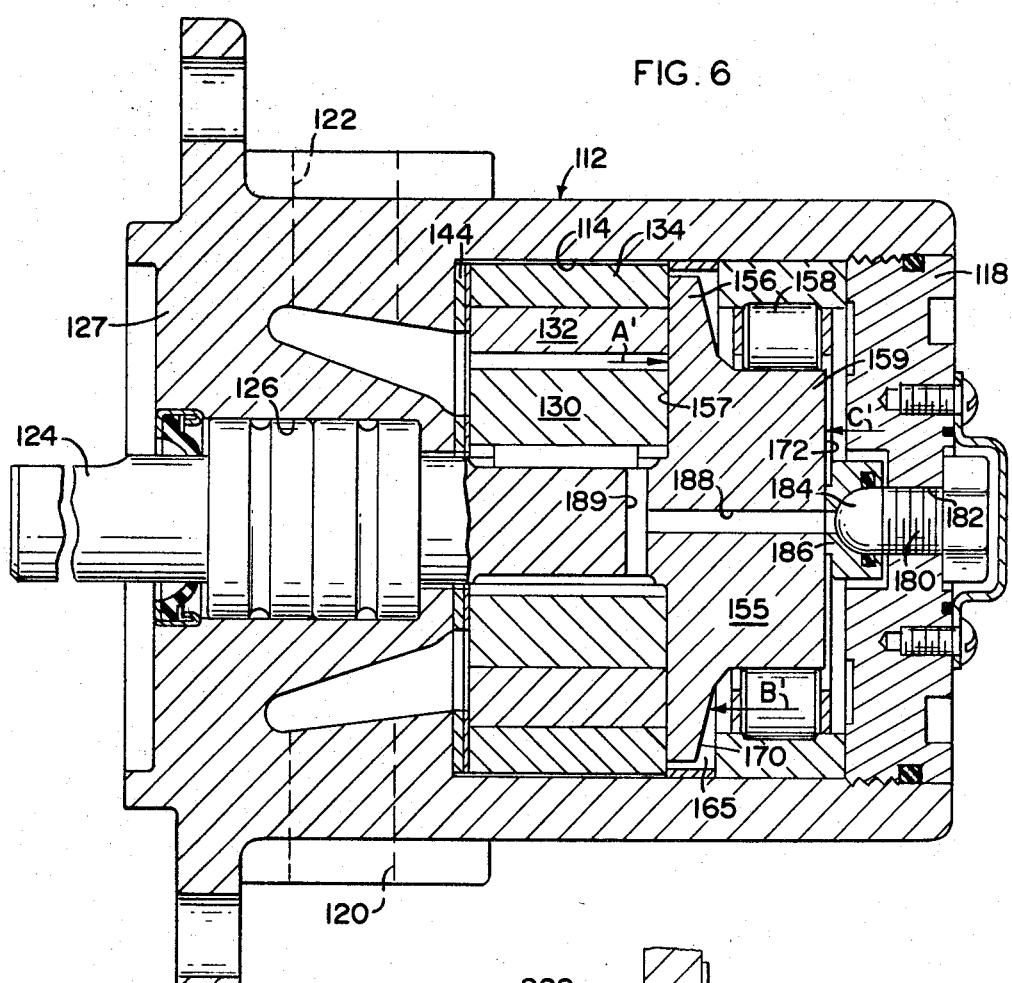
FIG. 6 is a cross-sectional view similar to FIG. 1 illustrating a modified form of the invention.

Referring now more in detail to the drawings wherein the showings are for the purpose of illustrating a preferred embodiment of the invention only and not for the purposes of limiting the same, there is illustrated in FIG. 1 a pump assembly generally indicated by the reference numeral 10. This pump assembly includes a housing 12 defining an internal cavity 14. The housing may take various forms but, as shown, is in two parts, a main housing portion 16 which is generally cup-shaped including an end wall 17 and a closure portion 18 which is removably threaded in the open end of the cup-shaped portion 16. Formed in the main housing portion 16 is a pair of ports which, for purposes of this disclosure, may be designated as an inlet port 20 and an outlet port 22.

A shaft 24 extends through an opening 26 in the closure 18 into the cavity 14. The inner end of the shaft 24 is rotatably supported by appropriate bearings such as roller bearings 28. Secured to the shaft 24 by a key 29 is an externally toothed gear member 30 which rotates with the shaft about the longitudinal axis of the shaft 24. Received over the gear member 30 is an internally toothed ring gear member 32 which is supported for rotation about an axis spaced from the axis of the shaft 24.

The ring gear 32 is received within an eccentric bearing member 34. The bearing member is in the shape of a ring having an inner surface 36 in which the internally toothed gear 32 is rotatably supported. The bearing member 34 is held against rotation relative to the housing with the outer circumferential surface of the bearing member being radially spaced inward from the inner wall of the cavity 14 thereby defining a bearing ring clearance at 38 for a purpose described in detail in my aforesaid Pat. No. 3,198,127.

The gears 30, 32 cooperate in a manner which is described in my aforementioned patents, to which reference may be had for a detailed description. It is believed sufficient for this disclosure to point out that the ring gear 32 will have one tooth more than that of the gear member 30 with the teeth of the gears normally being in sliding sealing engagement so that as the gear members 30, 32 rotate they cooperate to define a plurality of pumping or fluid chambers 40, 42 which progressively increase and decrease in volume.

Figure 3:
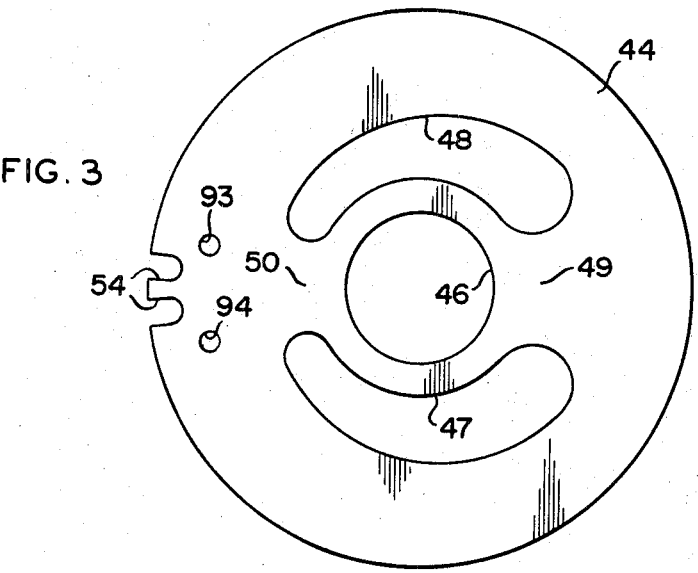
FIG. 3 is a view of the adjustable manifold ring.

The pumping chambers 40, 42 are closed at one axial end by a manifold ring 44. As best viewed in FIG. 3, the manifold ring 44 includes a central aperture 46 through which the shaft 24 extends. The manifold ring further includes a pair of manifold ports 47, 48 which are arcuate in configuration with the ends of the ports being separated by land portions 49 and 50. As assembled, the manifold port 47 communicates with the outlet port 22. The position of the manifold ports relative to the inlet and outlet ports is maintained by a pin 52 which is received in one of a pair of circumferentially spaced slots 54 formed in the periphery of the ring 44. The purpose of the pairs of slots will be described in further detail hereinafter.

The other axial end of the pumping chambers 40, 42 is closed by a sealing member 55 which is formed integral with the shaft 24. The sealing member 55 includes a radially extending disc 56 having an axially facing sealing surface 57 opposing surfaces 31, 33 on gears 30, 32 respectively and extending radially outwardly beyond the outer surface of the ring gear 32 to overlie at least a portion of the axial end face 35 of the bearing member 34 in a manner similar to that described in my aforementioned Pats. 3,034,448 and 3,198,127. A roller bearing assembly 58 is received within the cavity 14 in the housing 12 with the rollers being in engagement with an outer cylindrical surface 59 on the sealing member 55. The bearing supports for the shaft 24 and sealing member 55 are such that a limited, but relatively substantial amount of axial movement of the shaft and sealing member is permitted whereby a clearance may be established between the sealing member and the gears and bearing 34.

A spacer ring 60 is interposed between the outer face of the bearing 58 and the eccentric bearing member 34 with the spacer ring maintaining the axial position of the bearing member.

A bushing seal 62 and O-ring seal 64 cooperate to form a seal between the shaft 24 and the opening 26. The inner end of the bushing 62 abuts the axial end of the cylindrical portion 59 with a spring washer 63 permitting movement of the bushing as the shaft 24 and sealing member 55 shift axially.

The combination of the sealing member 55 and closure 18 cooperate to define a pressure seal chamber 65 in the cavity 14.

The shifting of the shaft 24 and sealing member 55 is controlled by hydraulic pressure in the pressure seal chamber 65. The source of this pressure is the decreasing volume chamber 42 which contains hydraulic fluid at high pressures. This high pressure fluid exerts hydraulic forces on all surfaces with which it comes into contact including the axial face 57 of the sealing disc 56. These hydraulic forces may be integrated and considered as a single axial force A acting at the radial midpoint of the chamber 42. This force A thus acts to move the sealing member 55 and the shaft 24 to the right as viewed in FIG. 1, thereby establishing a face clearance between the surface 57 and the axial ends of the eccentric bearing and rotating gears 30, 32. This face clearance provides a flow path through which hydraulic fluid in the chamber 42 may move radially outwardly along surface 57 and into the pressure seal chamber 65. The hydraulic fluid in chamber 65 exerts axial forces B on surface 70 and C on surface 71 of the sealing member 55, which forces act in a direction opposite to force A and tend to move the shaft 24 and sealing member 55 toward the gears 30, 32 and bearing 34.

It is contemplated that a controlled amount of face clearance will be maintained between surface 57 and the opposing surfaces 31, 33, 35 on gears 30, 32 and bearing member 34. This clearance is maintained by permitting a controlled flow of hydraulic fluid from the seal chamber 65 back to tank or other source of low pressure. In broad concept, this is accomplished by a metered flow of the fluid through an orifice back to tank. More specifically, and as best viewed in FIGS. 4 and 5, the fluid in chamber 65 is permitted to flow axially through the clearance space 38 into a recess 72 formed in the end wall of the housing. A bleed orifice or port 74 connects the recess 72 with a generally T-shaped recess 76 in end wall 17 of the housing. This latter recess includes oppositely directed recess arms 77, 78 and a radially extending recess leg 79 which extends radially inward to the shaft 24. As shown in FIG. 5, the flow of fluid through the bleed orifice 74 is controlled by an adjustable means which, in the embodiment shown, comprises a metering screw or valve 80 adjustably threaded in a bore 82 in the side wall of the housing. The screw includes a tapered nose portion 84 which cooperates with the orifice 74 to provide an adjustable passage through which the fluid passes.

The T-shaped recess 76 is placed in communication with the low pressure source through adjustment of the manifold ring 44. Thus, referring to FIG. 4, the manifold ports 47, 48 are adapted to overlie one or the other arms 77, 78 depending on the adjusted position of the manifold ring 44. As viewed in that figure, the manifold ring 44 has been adjusted counter-clockwise so that the manifold port 47 overlaps the arm 78 whereby the hydraulic fluid in the recess 76 is returned back to the inlet 20. It will be apparent that, upon clockwise adjustment of the manifold ring 44, the manifold port 47 will be shifted out of communication with the arm 78 and the manifold port 48 will come into communication with the arm 77. In this manner, reverse rotation of the unit is accommodated so that if the inlet port becomes the outlet port and the outlet port becomes the inlet, the same pressure sealing characteristics of the unit may be retained.

The above-described unit thus contemplates a pressure sealed construction in which flow along the surface 57 is the source by which hydraulic pressure is built up to move the sealing member 55 into sealing relationship with the rotating gears. This arrangement is particularly adaptable to changing conditions. For example, when the unit is first started, a substantial face clearance will exist between surface 57 and the opposing surfaces 31, 33 and 35 so that substantial fluid flow along that surface will occur. However, as the hydraulic pressure behind the sealing member 55 in chamber 65 builds up, the sealing member will shift axially to close the face clearance and establish a sealing relationship with the gears. Should the face clearance be insufficient for the proper maintenance of pressure in the pressure seal chamber, this is compensated for by axial shifting of the sealing member 55 thereby opening the face clearance and permitting increased fluid flow until the pressure has been re-established.

It is apparent that the pressure in the pressure seal chamber 65 and, hence, the face clearance is determined by the orifice size.

With a small orifice, the flow out of the chamber 65 will be at a low rate so only a small face clearance will be established. With a larger orifice, a greater face clearance will result.

It also should be noted that the face clearance is self-adjusting to compensate for the heating of the fluid and its accompanying change in viscosity. Thus, it is well known that the flow of fluid between two planar surfaces is, in part, dependent on the viscosity of the fluid while the flow of fluid through a sharp edged orifice is insensitive to any change in viscosity of the fluid. As a result, the flow of fluid radially along the surface 57 tends to increase as the fluid is heated and the viscosity of the fluid decreases but the flow of fluid through the orifice remains essentially constant so that the pressure in the pressure seal chamber tends to build up as the fluid temperature increases. However, as the pressure increases, the sealing member 55 moves axially and decreases the face clearance thereby reducing the flow of the fluid.

As above-described, the device is pressure sealed through the face leakage. This face leakage should, in theory, be sufficient to maintain the sealing member in proper relationship to the rotating gears. However, for this to work in practice it is necessary that the alignment of the gears 30, 32, the bearing member 34 and the sealing member 55 be accurately maintained. Should the sealing member 55, for example, be mounted slightly cocked with respect to the end faces of the gears 30, 32, a condition other than ideal will exist and the result may be that either oversealing or undersealing of the unit may occur. Accordingly, as a means for supplementing the face leakage, it is contemplated that a positive source of hydraulic pressure will be placed in communication with the pressure seal chamber 65. Thus, referring to FIGS. 1 and 4, there is provided in the bearing member 34 a pair of circumferentially spaced, axially extending fluid passages 90, 92 which open axially through surface 35 at a point radially inwardly of the outer periphery of disc 56. The manifold ring 44 also has a pair of circumferentially spaced apertures 93, 94 with the aperture 93 being adapted to be aligned with the passage 90 and the aperture 94 aligned with the passage 92.

The aperture 93 is in communication with the port 22 through a bleed passage 95 while the aperture 94 is in communication with the port 20 by a bleed passage 96. As is apparent from FIG. 4, the passage 95 thus communicates passage 90 with the outlet port 22 and through the clearance between surfaces 35 and 57 thereby provides a bleed passage through which high pressure fluid may be introduced to the pressure seal chamber. In the event operation of the device is reversed and the outlet port becomes the inlet port, the manifold ring 44 may be shifted clockwise as viewed in FIG. 4 thereby placing aperture 94 in alignment with passage 92 whereby hydraulic pressure in port 20 will be transmitted through passages 96 and 92 to the pressure seal chamber. In this manner, the manifold ring functions as a valve to control the flow of fluid through passages 90, 92.

OPERATION

Figure 4:
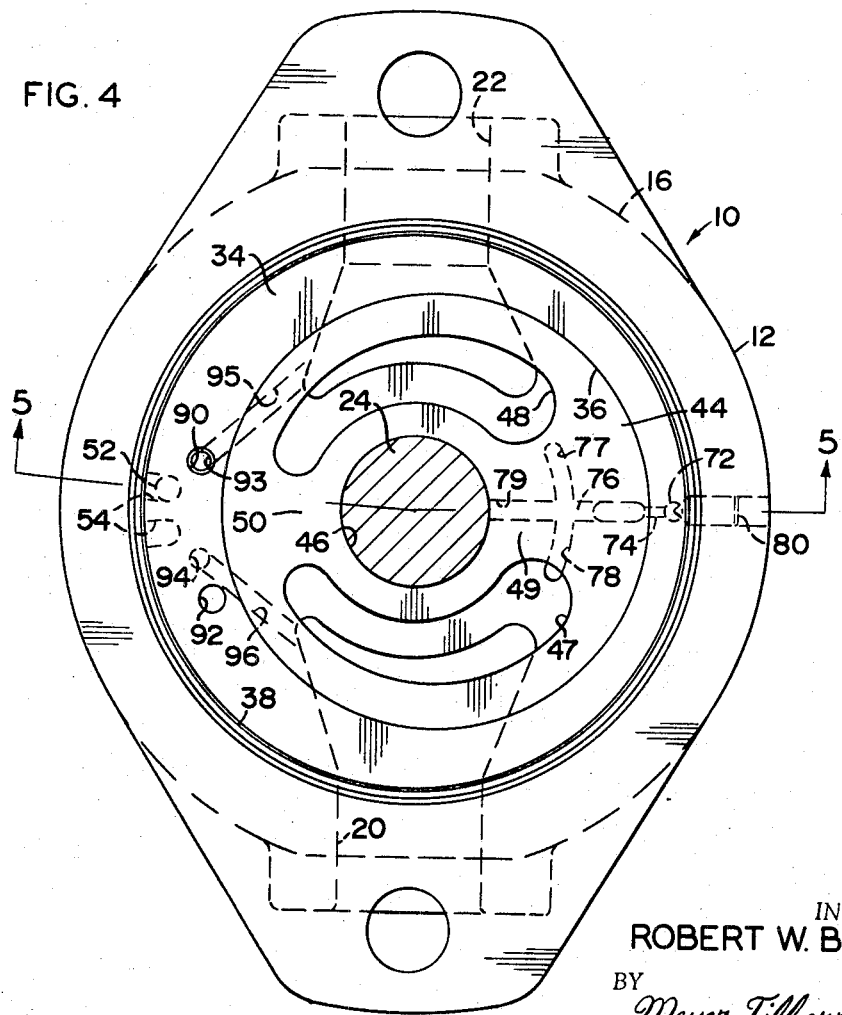
FIG. 4 is an end elevation view of the housing with the end closure removed and only the eccentric member and the manifold ring plate in the housing.

In operation, and assuming the parts to be in the condition illustrated in FIGS. 1 and 4, rotation of shaft 24 will generate hydraulic pressure in the decreasing volume chamber 42. If the face clearance along surface 57 is small, an unbalanced pressure condition will exist and the shaft and sealing member 55 will be shifted to the right thereby permitting hydraulic fluid to flow radially between the surfaces 31, 33, 35 and 57. In addition, fluid will bleed through the bleed passage 95 and passage 90 into the pressure seal chamber 65. Because of the restrictive orifice as determined by the setting of the metering screw 80, hydraulic pressure in the pressure sealed chamber will build up and result in the shifting to the left of the shaft and seal member 55. The amount of face clearance which is ultimately established will be dependent on the setting of the metering screw 80. Thus, fluid in the pressure seal chamber 65 will flow along the clearance 38 into the recess 72 and then through the orifice 74 into the T-shaped recess 76. Due to the overlap of the manifold port 47 with the recess arm 78, the fluid will then flow back to the inlet port 20. By adjusting the metering screw 80, the face clearance is adjusted and, hence, the volumetric performance of the unit is also adjusted.

If operation of the device is to be reversed, it is necessary only to remove pin 52, rotate the manifold ring 44 in a clockwise direction and place the pin back in the other of the slots 54 in the ring 44. Thereupon, the inlet port becomes the outlet port, the aperture 94 is placed in communication with the passage 92 and the manifold port 48 is placed in communication with the recess arm 77. In all other respects, operation of the unit is as described above.

Several aspects of this device should be noted. By providing a bleed return to low pressure, the pressures in the pressure seal chamber may be controlled thereby eliminating the need for relatively complex and expensive sealing of the shaft. Moreover, by eliminating these complex seals, it is also possible to expose a greater area of the cylindrical portion 59 to the fluid pressure in the pressure sealed chamber. This advantage is particularly important under conditions in which both ports 20, 22 are pressurized whereby a maximum area in the pressure seal chamber is needed to maintain the proper face clearance. Moreover, the pressure forces on the seal member are evenly distributed concentrically over a wide area. Opposing these forces is an essentially eccentric load represented by a force A with the net result being that the concentric forces redistribute the bearing loads. This is particularly important in high pressure pumps and significantly contributes to increasing the bearing life.

The described arrangement has particular advantages when the unit is used as a motor. As is well known, some applications require the availability of high torque at the start of the operating cycle. This arrangement provides such a capability. Thus, when operating as a motor, the hydraulic pressure introduced to the unit creates an unbalanced pressure condition which displaces the sealing member 55 and shaft 24 to the right thereby causing a condition of maximum face clearance. The pressurized fluid then flows along the surface 57 and fills the pressure seal chamber 65 and, because of the bleed orifice 74, hydraulic pressure in the seal chamber builds up causing the shaft 24 and sealing member 56 to move to the left. Depending on the setting of the orifice, an operating face clearance is established at the very initiation of the cycle so that as the gears 30, 32 rotate, maximum torque is delivered by the unit and it is not necessary for the unit to operate for a period of time before picking up the load.

MODIFICATIONS

Referring now to the embodiment of FIG. 6, there is illustrated a hydraulic device which is substantially the same as that illustrated in FIG. 1 with the exception that the shaft is reversed and a different arrangement for metering the fluid out of the pressure seal chamber is provided. Thus, a housing 112 has a cavity 114 formed therein with an end wall 118 closing the open end of the cup shaped housing. The shaft 124 extends into the housing through an opening 126 in the end wall 127. Inlet port 120 and outlet port 122 are provided in the housing 112. The gears 130 and 132, the bearing member 134, the manifold ring 144 and the passages and chambers associated therewith are the same as that described in connection with the embodiment of FIG. 1.

Formed as an integral part of the inner end of shaft 124 is the sealing member 155 which includes a sealing disc 156 with the axially facing surface 157 and the enlarged cylindrical portion 159. As in the embodiment of FIG. 1, a bearing 158 rotatably supports the cylindrical portion 159 in the cavity 114 whereby the shaft 124 and the seal member 155 may be shifted axially. The hydraulic force analysis described in connection with the embodiment of FIG. 1 also applies to the embodiment of FIG. 6. Thus, a force A' is generated in the decreasing volume chamber and acts against the surface 157 to shift the shaft 124 to the right as viewed in FIG. 6. Opposed to this are the oppositely directed axial forces B', C' which act against surfaces 170 and 172, respectively in the seal chamber 165 to shift the shaft 124 to the left.

It should be noted that the arrangement of FIG. 6 differs from the embodiment of FIG. 1 in that the area of surface 172 is greater than the corresponding area of surface 72. This results from inverting the shaft whereby the area of the shaft need not be deducted from the area exposed to the pressure in the seal chamber 165.

In lieu of the orifice metering arrangement used in the embodiment of FIG. 1, the embodiment of FIG. 6 employs a metering plug 180 adjustably threaded in an aperture 182 in the end wall 118. The plug has a metering plate 186 which is received over a semi-spherical end 184 on the plug. The plate 186 and surface 172 cooperate to define a metering clearance through which the hydraulic fluid in the pressure seal chamber 165 may be metered into a passage 188 in the end of the shaft 124. The passage 188 communicates with a radial passage 189 which, in turn, communicates with the keyway for shaft 124 whereby the fluid is transmitted to the front bearings and through the bearing drain back to tank.

The operation of the embodiment of FIG. 6 is, in all substantial respects, the same as that described in connection with the embodiment of FIG. 1 with the exception that as the shaft 124 and sealing member 156 are shifted, both the metering-in or face clearance between disc 156 and the bearing and gears and the metering-out clearance are adjusted. This is to be contrasted with the embodiment of FIG. 1 wherein the setting of the metering screw 80 constituted a fixed metering-out orifice. With the embodiment of FIG. 6, the adjustment of both the metering-in clearance and the metering-out clearance as the shaft is shifted thereby provides a somewhat more accurate positioning of the sealing member 155.

Figure 8:
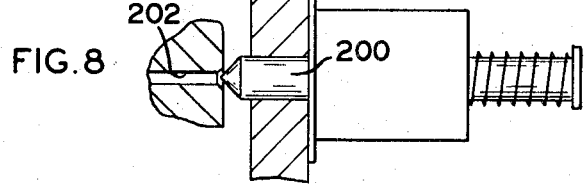
FIG. 8 illustrates a modified form of the adjustable metering orifice.
Figure 2:
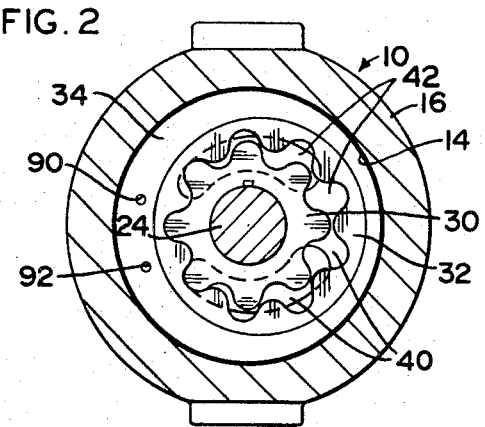
FIG. 2 is a sectional view taken along lines 2—2 of FIG. 1.

A further modification is illustrated in FIG. 8 wherein a solenoid actuated valve 200 is carried by the end wall of the housing and which cooperates with a dumping passage 202 formed in the end of the shaft. The valve 200 is intended to be used with a metering orifice such as those illustrated in FIGS. 1 and 6 with the valve 200 providing a selective means for dumping the seal chamber pressure back to low pressure. Although the valve 200 is shown as being associated with a passage in the shaft end, it will be appreciated that it can be anywhere in the system. In operation, and with the valve 200 closed, the device functions in the manner described above with the metering orifice controlling the face clearance. However, when valve 200 is actuated, the seal chamber is communicated with low pressure and the sealing member shifts to establish a maximum face clearance with the result that no appreciable output will be generated by the device. Upon closing valve 200, the primary metering-out orifice takes over to re-establish pressure in the seal chamber and thereby move the sealing member back to a position of sealing engagement with the bearing and/or gears.

The valve 200 may also be used as a combined dumping and metering valve.

Figure 9:
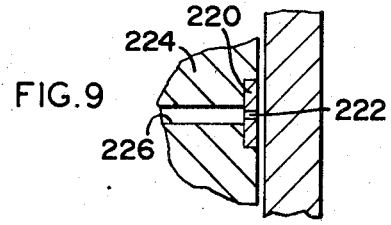
FIG. 9 illustrates a further modification of the metering orifice.

Still another metering arrangement is illustrated in FIG. 9 in which an orifice plate 220 is pressed into a recess in the end of the shaft 224. A small orifice 222 is punched into the orifice plate 220 and communicates with the passage 226 in the shaft. By controlling the size of the orifice 222, the proper face clearance can be maintained. Although the arrangement of FIG. 9 does lack the flexibility of the adjustable metering arrangements described in the embodiments of FIGS. 1 and 6, the mode of operation is otherwise the same as that described above.

An additional modification to the described device is desirable when the device is to be used as a motor. This modification is illustrated in FIG. 7 and relates to the outer ring gear member 32 in which radially outwardly extending grooves 230 are formed in the axial end face of the gear. These grooves provide flow passages whereby hydraulic fluid may be transmitted to the outer circumferential surface of the ring gear thereby to lubricate and float the ring gear in the bearing member 34. This arrangement is particularly necessary under conditions of high starting torque wherein a minimum face clearance is present and there would otherwise be insufficient fluid flowing through the face clearance to float the ring gear in the bearing.

Having thus described my invention, I claim:

1. An improved hydraulic device of the type described comprising: a housing, a shaft extending into and rotatably supported in said housing, a plurality of fluid chamber forming members rotatable with said shaft and defining a plurality of axially open ended chambers which progressively increase and decrease in volume as said shaft rotates to take in and discharge hydraulic fluid, means closing one axial end of said chambers, inlet and outlet ports in said housing in communication with said fluid chambers and a sealing member in said housing rotatable with said shaft, said sealing member cooperating with said housing to define a pressure seal chamber, said sealing member being axially movable relative to said chamber forming members with said sealing member having an axially facing surface adjacent to the other axial end of said chamber forming members to close the other ends of said chambers, the improvement comprising:

means communicating the fluid chambers with said pressure seal chamber whereby fluid may flow into said seal chamber, and means for metering the flow of fluid from said seal chamber whereby fluid pressure may be built up in said seal chamber to urge said sealing member toward said chamber forming members until a pressure balance is achieved and desired face clearance between said sealing member and said chamber forming members has been established.

2. The improvement of claim 1 wherein said communicating means includes means for metering the flow fluid into the seal chamber.

3. The improvement of claim 1 wherein said metering means comprises a restrictive orifice.

4. The improvement of claim 1 wherein said metering means comprises an adjustable orifice.

5. The improvement of claim 1 wherein said metering means comprises a surface carried by said housing cooperating with a surface on said sealing member to define a restrictive flow passage therebetween.

6. The improvement of claim 1 wherein said means closing the one axial end of said chambers comprises manifold means having manifold ports in communication with said fluid chambers and said inlet and outlet ports, and means adjustably supporting said manifold means whereby said manifold ports may be selectively placed in communication with said metering means.

7. The improvement of claim 1 and further including bleed passage means interconnecting said outlet port with said pressure seal chamber, and valve means for controlling the flow of fluid through said bleed passage means.

8. The improvement of claim 1 and further including a pair of bleed passages in said housing, one of said passages communicating one of said ports with said seal chamber and the other of said passages communicating the other of said ports with said seal chamber, and valve means for controlling the flow of fluid through said passages.

9. The improvement of claim 8 wherein said valve means comprises a manifold ring having a pair of spaced apertures therethrough, the spacing of said apertures being different from the spacing of said passages whereby only one of said apertures can be aligned with a passage at a time.

10. The improvement of claim 9 wherein said manifold ring further includes manifold ports in communication with said fluid chambers and said inlet and outlet ports, and means adjustably supporting said manifold ring whereby one of said apertures may be aligned with one of said passages, to communicate one of said inlet and outlet ports with said seal chamber while the other of said inlet and outlet ports is placed in communication with said metering means through one of said manifold ports.

11. The improvement of claim 1 wherein said metering means includes a metering recess formed in said housing, manifold means in said housing, said manifold means including manifold ports in communication with said fluid chambers and said inlet and outlet ports, and means adjustably supporting said manifold means whereby said manifold ports may be selectively placed in communication with said metering recess thereby interconnecting said recess with one of said inlet and outlet ports.

12. The improvement of claim 3 wherein said restrictive orifice comprises an orifice plate in the end of said shaft, and passage means in said shaft connecting said plate to a source of low pressure.

13. The improvement of claim 5 wherein said surface on said housing is adjustable whereby the size of the flow passage may be varied.

14. The improvement of claim 1 wherein said metering means comprises a metering port and a valve cooperating with the port to control the rate of flow of fluid therethrough.

15. The improvement of claim 1 wherein said chamber forming members comprise an externally toothed inner gear and an internally toothed ring gear received over and in meshing engagement with said inner gear, said ring gear including a plurality of radially extending grooves formed in one end face thereof, said grooves extending from the inner periphery of said ring gear to the outer periphery thereof, and a bearing surface in said housing supporting the outer periphery of said ring gear.

16. The improvement of claim 1 wherein said sealing member comprises a radially extending disc portion and an enlarged cylindrical portion formed on said shaft, and bearing means in said housing rotatably and shiftably supporting said enlarged cylindrical portion.

17. The improvement of claim 1 wherein said shaft terminates in said pressure seal chamber with the terminal end of said shaft including an axially facing surface exposed to the fluid pressures in said seal chamber.

18. An improved hydraulic device of the type described comprising a housing, a shaft extending into and rotatably supported in said housing, first and second chamber forming members in said housing, said members cooperating to define a plurality of fluid chambers which progressively increase and decrease in volume as said shaft rotates to take in and discharge hydraulic fluid, a bearing located between said housing and one of said chamber forming members having a bearing surface cooperating with a surface on one of said chamber forming members to support said member for rotation, the improvement comprising:

fluid passage means in said one member communicating said fluid chambers with said surfaces whereby fluid may be transmitted to said surfaces.

19. The improvement of claim 18 wherein said bearing is a ring and said bearing surface is on the inner periphery thereof, said one member being received within said ring with the outer periphery of said member supported on said bearing surface, means closing the axial ends of said bearing surface whereby fluid transmitted to said bearing surface floats said member in said bearing.

20. The improvement of claim 19 wherein said fluid passage means comprises a plurality of radially extending grooves formed in the axial end of said one member.

21. The improvement of claim 1 wherein said metering means allows less fluid to flow from said seal chamber as the face clearance increases.

22. The improvement of claim 2 wherein said means for metering the flow into said seal chamber allows more fluid to flow into said chamber as the face clearance increases.

23. The improvement of claim 1 and including means for selectively dumping the pressure in said seal chamber.

References Cited

UNITED STATES PATENTS

| | | | |
|---|---|---|---|
| 2,437,791 | 3/1948 | Roth et al. | 103—126(L) |
| 2,444,165 | 6/1948 | Lauck | 103—126(L) |
| 2,627,232 | 2/1953 | Lauck | 103—126(L) |
| 2,787,224 | 4/1957 | Udale | 103—126(L) |
| 2,915,977 | 12/1959 | Campbell | 103—126(L) |
| 3,034,448 | 5/1962 | Brundage | 103—126(A) |
| 3,127,843 | 4/1964 | Brundage | 103—126(A) |
| 3,198,127 | 8/1965 | Brundage | 103—126(A) |
| 3,240,158 | 3/1966 | Brundage | 103—126(A) |
| 1,459,552 | 6/1923 | Rathman | 103—126(LB) |

MARK NEWMAN, Primary Examiner

W. J. GOODLIN, Assistant Examiner

U.S. Cl. X.R.

418—133, 171